United States Patent
Jeon et al.

(10) Patent No.: US 9,729,651 B2
(45) Date of Patent: Aug. 8, 2017

(54) METHOD FOR DELIVERING PUSH NOTIFICATION AND PUSH NOTIFICATION SERVER FOR PERFORMING THE SAME

(71) Applicant: ELECTRONICS AND TELECOMMUNICATIONS RESEARCH INSTITUTE, Daejeon (KR)

(72) Inventors: Jong-Hong Jeon, Daejeon (KR); Seung-Yun Lee, Daejeon (KR); Sung-Han Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 356 days.

(21) Appl. No.: 14/480,828

(22) Filed: Sep. 9, 2014

(65) Prior Publication Data

US 2015/0081817 A1    Mar. 19, 2015

(30) Foreign Application Priority Data

Sep. 13, 2013 (KR) .......... 10-2013-0110418
Aug. 11, 2014 (KR) .......... 10-2014-0103215

(51) Int. Cl.
*G06F 15/16* (2006.01)
*H04L 29/08* (2006.01)
(Continued)

(52) U.S. Cl.
CPC .......... *H04L 67/26* (2013.01); *H04L 12/589* (2013.01); *H04L 51/24* (2013.01); *H04L 51/36* (2013.01); *H04L 69/40* (2013.01)

(58) Field of Classification Search
CPC .......... H04L 67/26; H04L 51/24; H04L 51/36; H04L 12/589
(Continued)

(56) References Cited

U.S. PATENT DOCUMENTS

| 5,940,740 A | * | 8/1999 | Aas | H04M 3/533 340/7.22 |
| 2007/0282959 A1 | * | 12/2007 | Stern | G06Q 30/02 709/206 |

(Continued)

FOREIGN PATENT DOCUMENTS

| KR | 2001-0008460 | 2/2001 |
| KR | 10-2012-0130427 | 12/2012 |
| KR | 10-2013-0108874 | 10/2013 |

*Primary Examiner* — Chris Parry
*Assistant Examiner* — Weiwei Stiltner
(74) *Attorney, Agent, or Firm* — Kile Park Reed & Houtteman PLLC

(57) ABSTRACT

The present invention relates to a method for delivering a push notification and a push notification server for performing the method. In the push notification delivery method, by a push notification server, a push notification message is received from a push notification server application. By the push notification server, the push notification message is sent to a push notification client registered in association with the push notification server application. If the push notification message is not sent, the push notification message is stored in a transmission queue within the push notification server and is resent to the push notification client, or an update, expiration or cancellation of the push notification message is processed. A push delivery state of a push notification message, sending of which has finally failed, is changed to a delivery failed state, and failure results are transferred to the push notification server application.

8 Claims, 10 Drawing Sheets

(51) Int. Cl.
*H04L 12/58* (2006.01)
*H04L 29/14* (2006.01)

(58) Field of Classification Search
USPC .................................................. 709/204–206
See application file for complete search history.

(56) References Cited

U.S. PATENT DOCUMENTS

| | | |
|---|---|---|
| 2008/0127324 A1 | 5/2008 | Seo et al. |
| 2010/0173658 A1 | 7/2010 | Fan et al. |
| 2012/0147887 A1* | 6/2012 | Fan ..................... H04L 12/1868 370/390 |
| 2012/0311082 A1 | 12/2012 | Munson et al. |
| 2013/0047034 A1* | 2/2013 | Salomon ................. H04W 4/00 714/18 |
| 2013/0198296 A1* | 8/2013 | Roy ..................... G06Q 10/107 709/206 |
| 2013/0346521 A1* | 12/2013 | Arabo ............... H04L 29/08693 709/206 |
| 2014/0215571 A1* | 7/2014 | Shuster ............... H04L 63/1483 726/4 |

* cited by examiner

| PUSH SERVICE TYPE | SUCCESS RATE (PERCENT) | DELAY TIME (SECONDS) |
|---|---|---|
| ANDROID C2DM | 99.7 | 3.2 |
| APNS | 95.2 | 3.1 |
| CLICKATEL SMS | 89.3 | 4.3 |
| BLACKBERRY PUSH SERVICE | 98.4 | 2.9 |
| MICROSOFT PUSH NOTIFICATION SERVICE | 94.8 | 2.8 |

FIG. 1

METHOD FOR DELIVERING PUSH NOTIFICATION AND PUSH NOTIFICATION SERVER FOR PERFORMING THE SAME

CROSS REFERENCE TO RELATED APPLICATIONS

This application claims the benefit of Korean Patent Application Nos. 10-2013-0110418, filed Sep. 13, 2013 and 10-2014-0103215, filed Aug. 11, 2014, which are hereby incorporated by reference in their entirety into this application.

BACKGROUND OF THE INVENTION

1. Technical Field

The present invention relates generally to a method for delivering a push notification and a push notification server for performing the method and, more particularly, to a method for delivering a push notification and a push notification server for performing the method, which can manage delivery states for respective stages of a procedure in which a push notification message is delivered from a push notification server application to a push notification client application within a user terminal through the push notification server, and can deliver push notifications depending on delivery conditions.

2. Description of the Related Art

With the development of wireless network technology and the popularization of smart devices including smart phones, various types of application programs have appeared, resulting in a significant increase in the usage of wireless resources.

For example, Korean Patent Application Publication No. 10-2013-0108874 entitled "Method and apparatus for implementing an improved notification service for a smart terminal" discloses technology for receiving notification requests from other application servers and a web server, respectively, and effectively processing respective notification request signals through notification service devices corresponding to respective notification requests.

In this way, the number of application programs of a type (hereinafter referred to as an "always-on connection type") in which each application program is always connected to a network so as to receive a real-time push message (hereinafter referred to as a "push notification") or the like from the network, as in the case of a messenger service, has rapidly increased recently. The "always-on connection" application programs are problematic in that they are prepared to receive push services while respectively maintaining connections to service providers, thus causing excessively large traffic and rapidly increasing battery power consumption.

In order to solve the above problems, in "Apple" and "Google", applications in a client maintain connections to push servers through a single daemon. For example, a central push server (for example, Apple Push Notifications (APNs) or Cloud to Device messaging (C2DM)) representatively receives a push message sent from a service provider via an always-on connection. Further, the central push server provides a scheme for sending the push message to the client.

However, the central push server in "Apple" and "Google" does not provide the integrity of push messages. That is, a case where the client cannot receive a push message frequently occurs. In order to provide a push service to clients via the always-on connection, the push server always makes connections to all clients, which will use the push service, and sends push messages to the clients. However, if the network is disconnected before push messages reach the corresponding clients after being attempted to be sent to the clients, the clients cannot receive the push messages. In this case, since the conventional push server does not have a separate management process for allowing the clients to definitely receive the push messages, the reliability of the push messages cannot be guaranteed.

In detail, the push server receives push messages to be sent to clients from an external service provider and sends the push messages to the clients. After sending the push messages, the push server does not perform an additional operation regardless of the results of reception of push messages. That is, even if a client does not normally receive a push message, the conventional push server does not resend a push message or randomly resends a push message without checking a connection to the client.

For example, even in the case of a push message service, such as a KakaoTalk messenger, which is actually operated, there may frequently occur a case where a client does not receive a push message even if the push server sends/resends a push message. As shown in FIG. 1, a conventional commercial push service is problematic in that a case where a push message is not successfully transferred to the client frequently occurs.

In this way, the conventional push server determines that the sending of a push message has failed if the push server does not receive a response message from a client within a predetermined period of time after sending a push message. Further, the conventional push server is problematic in that, when a response is not received from a client, the push server merely recognizes that sending has failed, and does not perform additional handling.

SUMMARY OF THE INVENTION

Accordingly, the present invention has been made keeping in mind the above problems occurring in the prior art, and an object of the present invention is to provide a method for delivering a push notification and a push notification server for performing the method, which can manage delivery states for respective stages of a procedure in which a push notification message is delivered from a push notification server application to a push notification client application within a user terminal through the push notification server, and can deliver push notifications depending on delivery conditions.

In accordance with an aspect of the present invention to accomplish the above object, there is provided a method for delivering a push notification, including receiving, by a push notification server, a push notification message from a push notification server application; sending, by the push notification server, the push notification message to a push notification client registered in association with the push notification server application; if the push notification message is not sent, storing the push notification message in a transmission queue within the push notification server, and resending the push notification message stored in the transmission queue to the push notification client, or processing an update, expiration or cancellation for the push notification message; and changing a push delivery state of a push notification message, sending of which has finally failed, to a delivery failed state, and transferring failure results to the push notification server application.

Receiving the push notification message may include checking a delivery condition from the push notification message, and determining, based on results of checking the delivery condition, whether the push notification message corresponds to a high-priority push notification message or a low-priority push notification message.

Sending the push notification message may include setting priority of the push notification message depending on a delivery condition contained in the push notification message, and sends the push notification message depending on the set priority.

Transferring the failure results to the push notification server application may include transferring an error message corresponding to the failure results to the push notification server application.

The error message may include a control command field, an identification number field indicating a message in which an error has occurred, and an error message code indicating a type of error.

In accordance with another aspect of the present invention to accomplish the above object, there is provided a method for delivering a push notification, including receiving, by a push notification server, a delivery state check request message for each push notification message from a push notification server application; determining whether a corresponding push notification message has been sent, using an identification number contained in the delivery state check request message; if the corresponding push notification message, a delivery state of which is requested to be checked, has not yet been sent, transferring a delivery state message for the corresponding push notification message to the push notification server application; and if the corresponding push notification message, the delivery state of which is requested to be checked, has already been sent, sending a delivery state check request message to a push notification client.

The delivery state check request message may include a control command field, an identification number field indicating a message, a state of which is requested to be checked, and a delivery state message code indicating a message code for a delivery state request.

In accordance with a further aspect of the present invention to accomplish the above object, there is provided a push notification server, including a server application management unit for registering and managing each push notification server application that sends a push notification message; a message reception unit for receiving the push notification message from the push notification server application; a message delivery management unit for sending the push notification message to a push notification client in a specific terminal in correspondence with a push delivery condition, and managing a push delivery state; a client management unit for managing a list of terminals that receive the push notification message; and an authority management unit for inspecting authority to send the push notification message between the push notification server application and the push notification client and taking charge of authentication of the push notification server application and the push notification client.

The message delivery management unit may set delivery priority depending on a delivery condition contained in the push notification message, and send the push notification message depending on the set priority.

When the delivery condition contained in the push notification message is a preferred delivery condition, the push notification message may be sent prior to other messages. The message delivery management unit may be configured to, when the push notification message is not yet sent, store the push notification message in a transmission queue within the push notification server, and resend the push notification message stored in the transmission queue to the push notification client, or process an update, expiration or cancellation for the push notification message.

The message delivery management unit may change a push delivery state of a push notification message, sending of which has finally failed, to a delivery failed state, and transfer failure results to the push notification server application.

The message delivery management unit may transfer an error message corresponding to the failure results to the push notification server application.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram showing success rates and delay times for conventional push service types;

DESCRIPTION OF THE PREFERRED EMBODIMENTS

Figure 2:
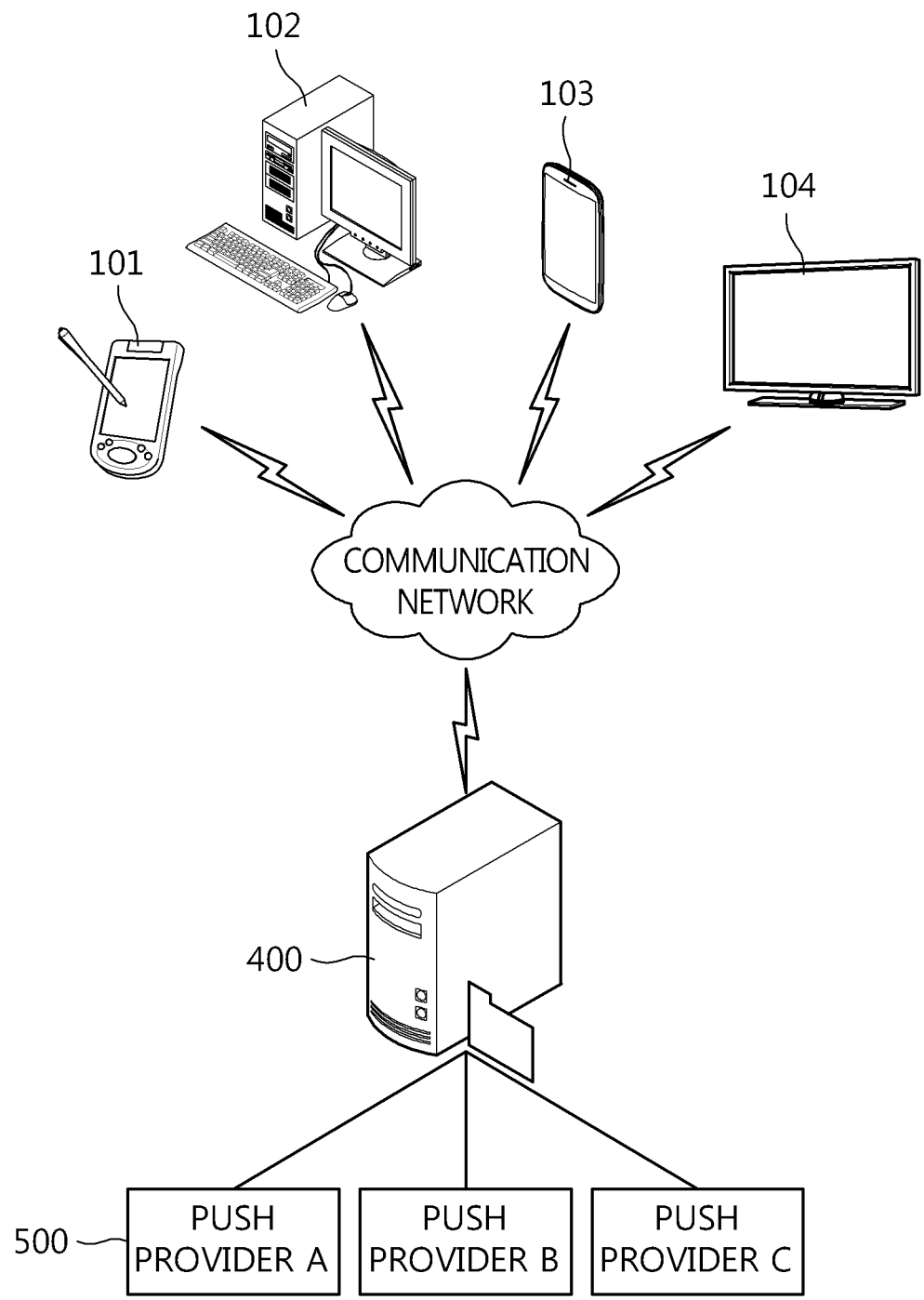
FIG. 2 is a diagram showing an environment to which a method for delivering a push notification and a push notification server for performing the method according to an embodiment of the present invention are applied.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, a method for delivering a push notification and a push notification server for performing the method according to embodiments of the present invention will be described in detail with reference to the attached drawings.

FIG. 2 is a diagram showing an environment to which a method for delivering a push notification and a push notification server for performing the method according to an embodiment of the present invention are applied.

Referring to FIG. 2, the environment to which the push notification delivery method and the push notification server for performing the method according to the embodiment of the present invention are applied includes, for example, terminals such as a tablet 101, a Personal Computer (PC) 102, a mobile phone 103, and a television (TV) 104, a push notification server 400, and push providers A to C 500.

The terminals correspond to the tablet 101, the PC 102, the mobile phone 103, the TV 104, etc. connected to the push notification server 400 through a wired/wireless network, and are configured to each include a push notification client 300 (FIG. 3) and receive a push notification message from the push notification server 400 through the push notification client. Here, the push notification client 300 (FIG. 3) may be operated on all terminals which are capable of communicating with the push notification server 400 and which include a mobile communication terminal that uses a mobile communication network, a mobile terminal that uses a wireless Local Area Network (LAN) environment, and a desktop, a server, a smart TV, a set-top box, and a vehicle computing terminal that use a wired network, but the client is not limited by such examples.

The push notification server 400 sets push delivery states, such as delivery succeeded, updated, expired, failed, canceled, and deleted states, and push delivery conditions, such as real-time delivery, compressed delivery, preferred delivery, expiration period, and emergency delivery, for each push notification message in a push delivery procedure performed between the push notification clients 300 (FIG. 3) of terminals depending on the connection states of the terminal to a communication network, thus enabling the push notification message to be processed.

Below, a push notification delivery procedure based on push delivery states and push delivery conditions will be described in detail with reference to FIG. 3.

Figure 3:
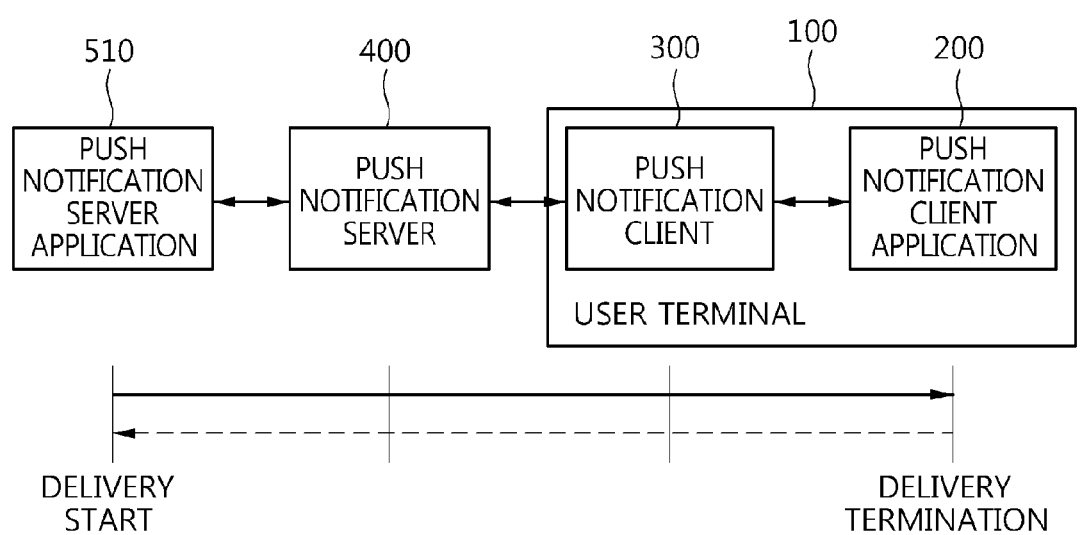
FIG. 3 is a diagram showing a push notification delivery procedure based on push delivery states and push delivery conditions according to an embodiment of the present invention.

FIG. 3 is a diagram showing a push notification delivery procedure based on push delivery states and push delivery conditions according to an embodiment of the present invention.

Referring to FIG. 3, an environment to which the push notification delivery procedure is applied includes a push notification server application 510, a push notification server 400, and a push notification client 300. The push notification server application 510 sends a push notification message to the push notification server 400 at the request of a push provider 500. The push notification server 400 relays the push notification message, received from the push notification server application 510, to the push notification client 300 included in a terminal 100. The push notification client 300 forwards the push notification message received from the push notification server 400 to a push notification client application 200.

In detail, the delivery of the push notification message starts at the push notification server application 510, and then terminates at the push notification client application 200 as the push notification message reaches the push notification client application 200. An acknowledge message for the delivery termination of the push notification message is processed in such a way that the acknowledge message is transferred from the push notification client application 200 to the push notification server application 510.

In this way, the system including the push notification server application 510, the push notification server 400, the push notification client 300, and the push notification client application 200 which participate in the push notification delivery procedure is characterized in that it manages delivery states in a delivery procedure for a push message and makes processing requests depending on the delivery states. Further, all push messages may be sent with delivery conditions indicated in the push messages. The push notification server application 510, the push notification server 400, the push notification client 300, and the push notification client application 200 are characterized in that they process delivery depending on the push delivery conditions indicated in the push messages.

Below, the detailed configuration of the push notification server 400 based on push delivery states and push delivery conditions will be described in detail with reference to FIG. 4.

Figure 4:
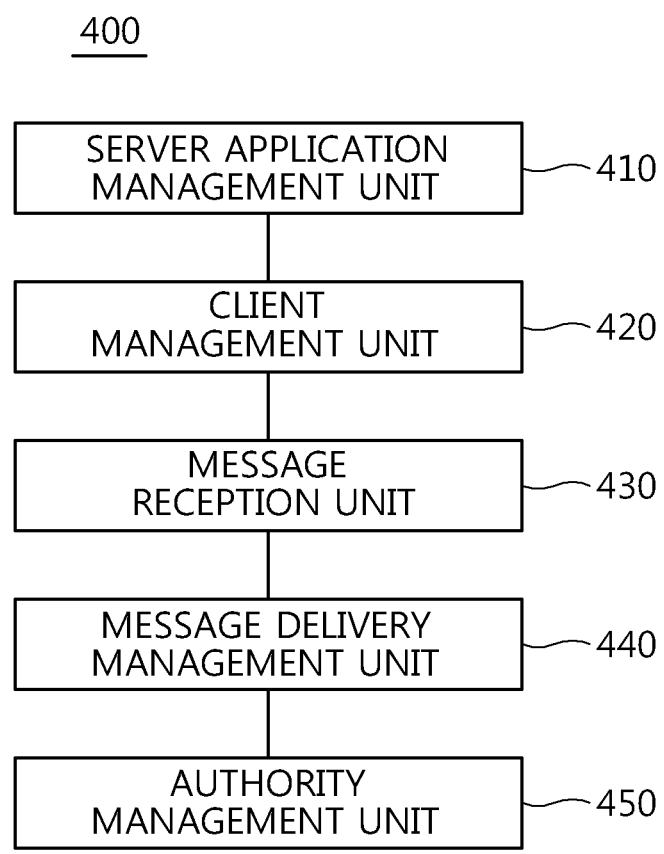
FIG. 4 is a configuration diagram schematically showing a push notification server according to an embodiment of the present invention.

FIG. 4 is a configuration diagram schematically showing the push notification server according to an embodiment of the present invention.

Referring to FIG. 4, the push notification server 400 includes a server application management unit 410, a client management unit 420, a message reception unit 430, a message delivery management unit 440, and an authority management unit 450.

The server application management unit 410 registers and manages a push notification server application 510 which sends push notification messages.

The client management unit 420 registers and manages a list of terminals which receive push notification messages, that is, a list of push notification clients 300 within the terminals.

The message reception unit 430 receives push notification messages sent from the push notification server application 510.

The message delivery management unit 440 sends the push notification messages to the push notification client 300 in correspondence with push delivery conditions, and manages the push delivery states of the push notification messages.

The authority management unit 450 inspects the authority to send push notification messages between the push notification server application 510 and the push notification client 300, and takes charge of authentication of the push notification server application 510 and the push notification client 300.

Below, variations in a processed state for push delivery states will be described in detail with reference to FIG. 5.

Figure 5:
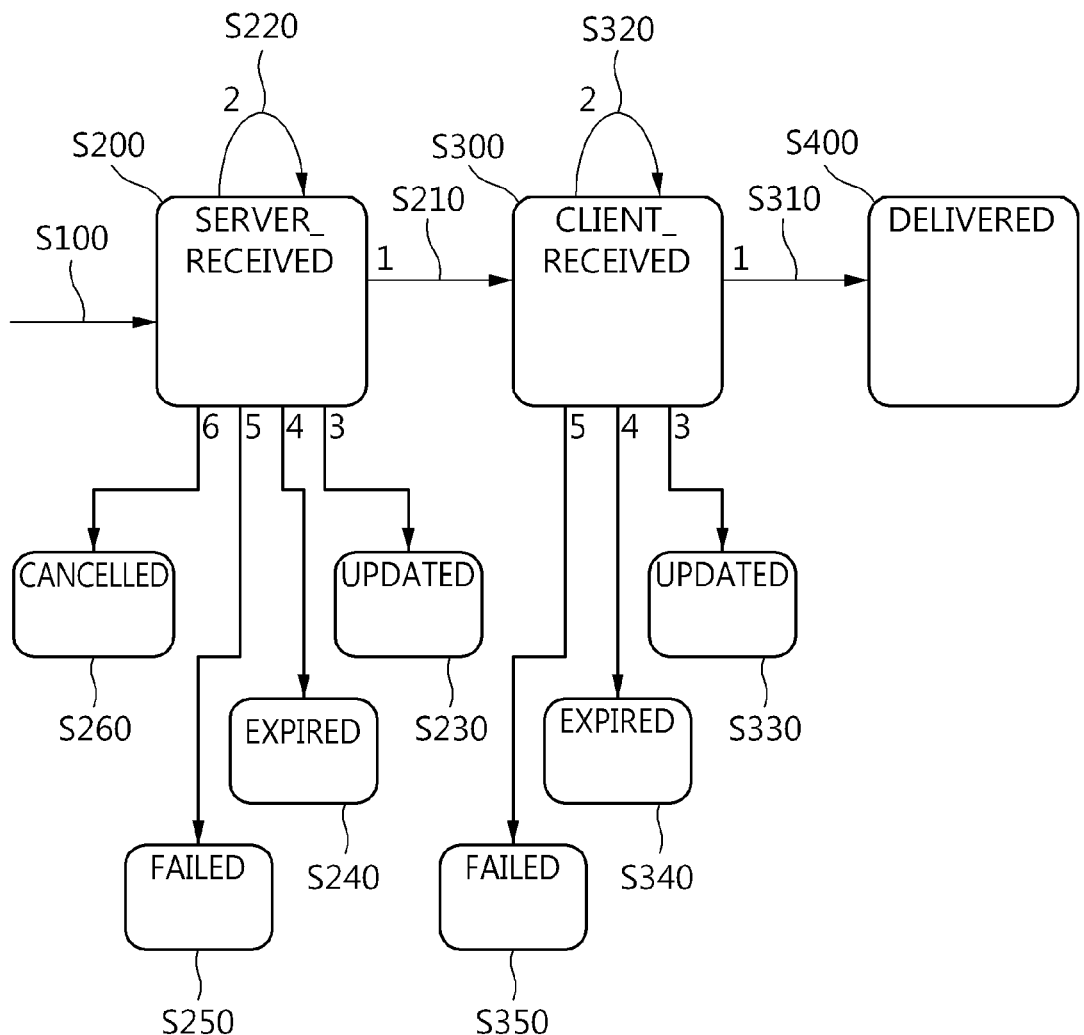
FIG. 5 is a state transition diagram showing variations in a processed state for push delivery states according to an embodiment of the present invention.

FIG. 5 is a state transition diagram showing variations in a processed state for push delivery states according to an embodiment of the present invention.

Referring to FIG. 5, the push notification server application 510 sends a push notification message to the push notification server 400 at the request of the push provider 500 at step S100.

At step S100, if the push notification message has normally reached the push notification server 400, the push delivery state thereof is changed to a server reception completion state (Server_Received) at step S200.

The push notification server 400 that has normally received the push notification message sends the push notification message to the push notification client 300 at step S210.

If the push notification message has not been sent from the push notification server 400 to the push notification client 300 at step S210, the push notification server 400 resends the push notification message to the push notification client 300 at step S220.

When the push notification server application 510 makes an update request for the push notification message sent to the push notification server 400, the push notification server 400 performs a push notification update on the push notification message, which is waiting to be sent without being sent to the push notification client 300, and changes the push delivery state thereof to an updated state (Updated) at step S230.

When the push notification server application 510 makes an update request for the push notification message sent to the push notification server 400, the push notification server 400 forwards the update request to the push notification client 300, for the push notification message that has been sent from the push notification server 400 to the push notification client 300.

The push notification server 400 that has normally received the push notification message changes the push delivery state of the push notification message, which is waiting to be sent, to an expired state if a predetermined expiration period for the push notification message has elapsed, and does not send the push notification message any longer (Expired) at step S240. Further, the push notification server 400 changes the push delivery state of a push notification message that has not yet been sent due to various causes to a delivery failed state (Failed) at step S250, and sends the results of delivery failure to the push notification server application 510. Further, when the push notification server application 510 makes a delivery cancellation request for a push notification message that is waiting to be sent in the push notification server 400 at step S100, the push notification server 400 changes the push delivery state of the push notification message to a cancelled state (Cancelled) at step S260, and does not send the push notification message any longer.

The push notification client 300 that has normally received the push notification message from the push notification server 400 changes the push delivery state of the push notification message to a client reception completion state (Client Received) at step S300.

The push notification client 300 sends the push notification message to the push notification client application 200 at step S310.

If the push notification message cannot be transferred from the push notification client 300 to the push notification client application 200 at step S310, the push notification client 300 resends the push notification message to the push notification client application 200 at step S320.

When the push notification client 300 receives an update request for the received push notification message, the push notification client 300 performs a push notification update on the push notification message, which is waiting to be sent without being sent to the push notification client application 200, and changes the push delivery state of the push notification message to an updated state (Updated) at step S330.

The push notification client 300 changes the push delivery state of the push notification message, which is waiting to be sent, to an expired state if a predetermined expiration period for the push notification message has elapsed, and does not send the push notification message any longer (Expired) at step S340. Further, the push notification client 300 changes the push delivery state of a push notification message that has not yet been sent due to various causes to a delivery failed state (Failed) at step S350, and sends the results of delivery failure to the push notification server application 510 through the push notification server 400.

When a push notification message is normally transferred from the push notification client 300 to the push notification client application 200 at step S310, the push delivery state of the push notification message becomes a delivery completion state (Delivered) at step S400.

Below, a procedure in which a push notification message is transferred from the push notification server application 510 to the push notification client application 200 will be described in detail with reference to FIG. 6.

Figure 6:
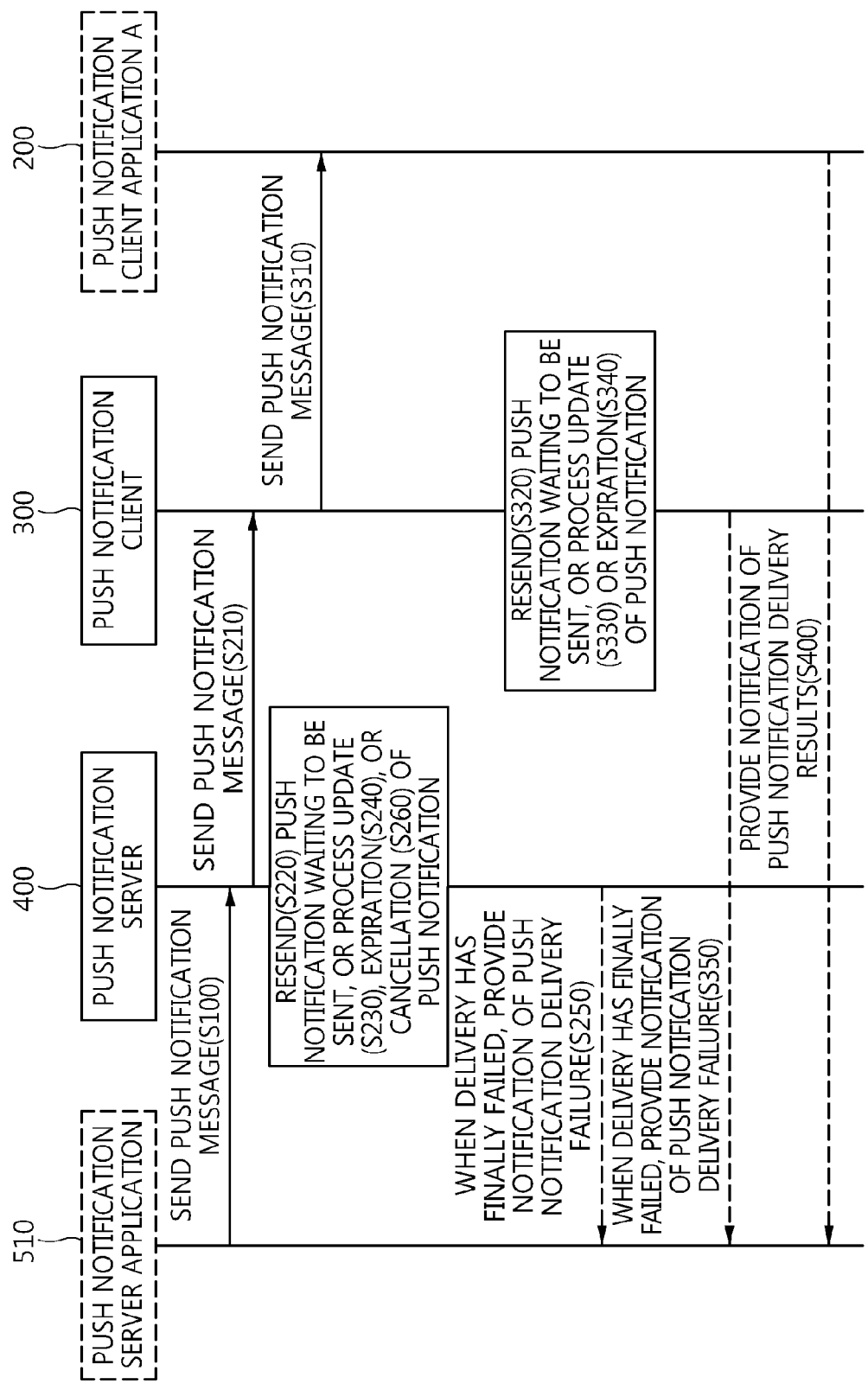
FIG. 6 is a flowchart showing a method for delivering a push notification according to an embodiment of the present invention.

FIG. 6 is a flowchart showing a push notification delivery method according to an embodiment of the present invention.

Referring to FIG. 6, in an environment to which the push notification delivery method is applied, the push notification server application 510, the push notification server 400, and the push notification client 300 and the push notification client application 200 of the terminal are located.

The push notification server application 510 sends a push notification message to the push notification server 400 at the request of the push provider 500 at step S100. In this way, as the push provider 500 sends a push notification message through the push notification server application 510 registered in the push notification server 400, a delivery procedure starts.

The push notification server 400 sends a push notification message to the push notification client 300 which is registered in association with the push notification server application 510 at step S210.

When a push notification message is not normally sent, the push notification server 400 stores the message in a transmission queue, and resends the push notification message stored in the transmission queue to the push notification client 300 at step S220, or processes an update (S230), expiration (S240) or cancellation (S260) for the message. Further, the push notification server 400 changes the push delivery state of the push notification message, the sending of which has failed, to a delivery failed state, and sends the results of delivery failure to the push notification server application 510 at step S250.

The push notification client 300 sends the push notification message to the push notification client application 200, which must receive the push notification message, at step S310.

When the push notification message is not normally sent, the push notification client 300 stores the message in a transmission queue and resends the push notification message stored in the transmission queue to the push notification client application 200 at step S320, or processes an update (S330) or expiration (S340) for the message. Further, the push notification client 300 changes the push delivery state of the push notification message, the sending of which has failed, to a delivery failed state, and transmits the results of delivery failure to the push notification server application 510 at step S350.

If the push notification message is normally transferred from the push notification client 300 to the push notification client application 200, the push delivery state of the message becomes a delivery completion (delivered) state. The push notification client application 200 sends a push notification success acknowledge message, that is, push notification delivery results, to the push notification server application 510 at step S400.

Below, the specification 700 of a message used in a method for delivering push notification messages, the specification 800 of a delivery state check request message required to check a push delivery state, and an error message specification 900 for representing an error message will be described in detail with reference to FIGS. 7 to 9.

Figure 7:
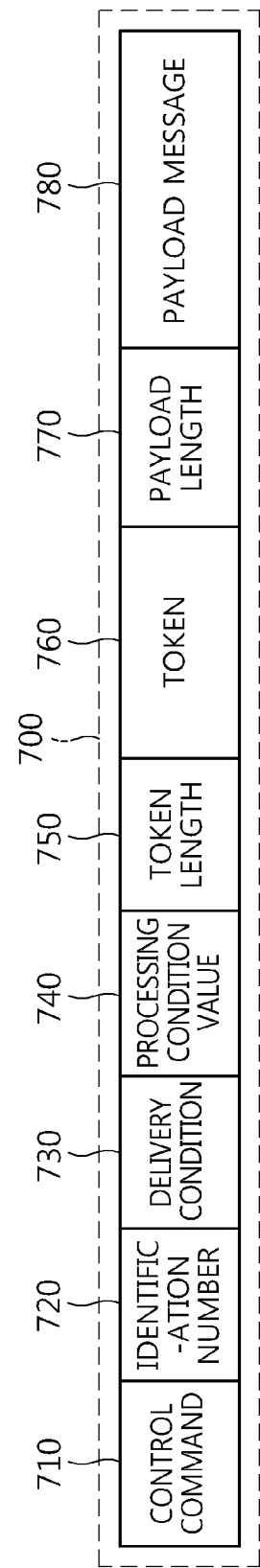
FIG. 7 is a diagram showing a specification used in a method for delivering a push notification message according to an embodiment of the present invention.

FIG. 7 is a diagram showing a specification used in a method for delivering a push notification message according to an embodiment of the present invention. FIG. 8 is a diagram showing the specification of a delivery state check request message according to an embodiment of the present invention. FIG. 9 is a diagram showing the specification of an error message according to an embodiment of the present invention.

Referring to FIG. 7, a message specification 700 used in a method for delivering a push notification message includes a control command field 710 for message delivery, an identification number field 720 for message identification, a delivery condition field 730 indicating message delivery conditions, a processing condition value field 740 depending on each delivery condition, a token length field 750 indicating the size of a token required to identify a message reception terminal, a token field 760 required to identify a message reception terminal, a length field 770 for a payload message including the contents of an actually delivered push notification message, and a payload message field 780 including the contents of the actually delivered push notification message.

Figure 8:
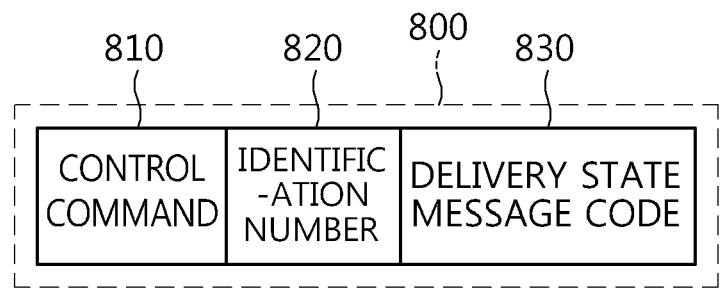
FIG. 8 is a diagram showing the specification of a delivery state check request message according to an embodiment of the present invention.

Referring to FIG. 8, the specification 800 of the delivery state check request message includes a control command field 810, an identification number field 820 indicating a message, the state of which is requested to be checked, and a delivery state message code 830 indicating a message code for a delivery state request.

Figure 9:
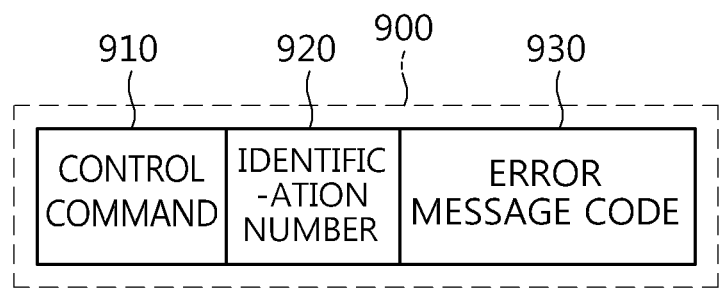
FIG. 9 is a diagram showing the specification of an error message according to an embodiment of the present invention.

Referring to FIG. 9, the specification 900 of an error message includes a control command field 910, an identification number field 920 indicating a message in which an error occurs, and an error message code 930 indicating the type of error.

Below, a method for displaying push delivery conditions and controlling the delivery sequence of push notification messages based on the push delivery conditions will be described in detail with reference to FIG. 10.

Figure 10:
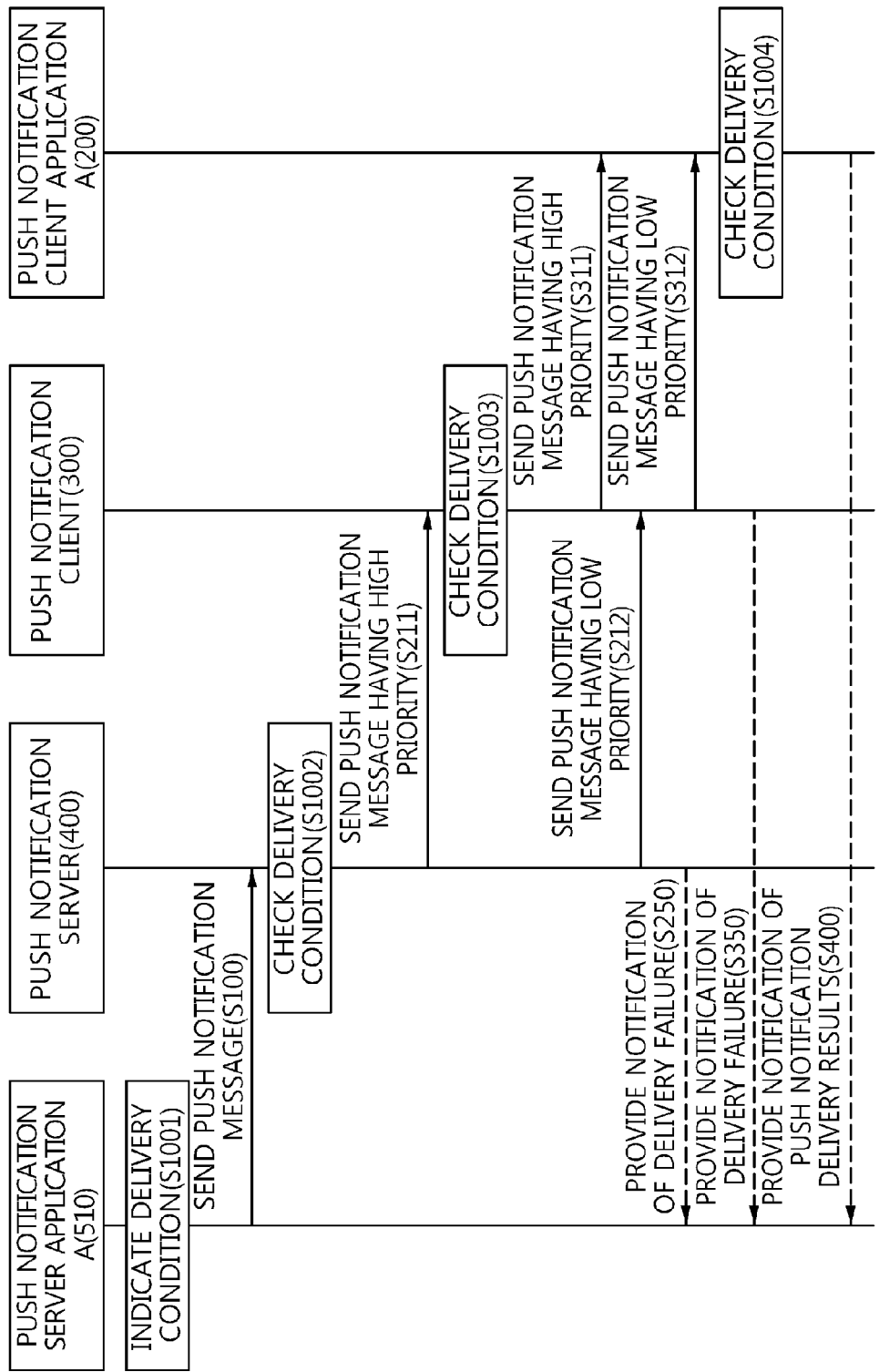
FIG. 10 is a flowchart showing a method for controlling the delivery sequence of push notification messages based on push delivery conditions according to an embodiment of the present invention.

FIG. 10 is a flowchart showing a method for controlling the delivery sequence of push notification messages based on push delivery conditions according to an embodiment of the present invention.

Referring to FIG. 10, before the push provider 500 sends a push notification message through the push notification server application 510 registered in the push notification server 400, delivery conditions (e.g., 730 and 740 of FIG. 7) are indicated in the message specification 700, and thus a delivery procedure for a push notification in which delivery conditions are indicated starts at step S1001.

The push notification server application 510 sends a push notification message to the push notification server 400 at the request of the push provider 500 at step S100.

The push notification server 400 checks a delivery condition 730 (FIG. 7) and a delivery condition value 740 (FIG. 7) from the received push notification message 700 at step S1002.

The push notification server 400 sets delivery priorities so that messages are delivered depending on the priorities as a result of delivery condition values checked at step S1002. If a given push notification message corresponds to a push notification message meeting a preferred delivery condition having high priority, such as real-time/emergency/disaster notification/preferred delivery, the push notification message meeting the preferred delivery condition having high priority is sent, prior to other notification messages, to the push notification client 300 that is registered in association with the push notification server application at step S211.

If, as a result of checking at step S1002, the push notification message corresponds to a push notification message having low priority, the push notification server 400 sends the push notification message having low priority to the push notification client 300 after the sending of push notification messages meeting the preferred delivery condition has been terminated at step S212.

If a push notification message is not sent in conformity with the above-described delivery condition, the push notification server 400 changes the push delivery state of the push notification message to a delivery failed state, and provides an error result message (see FIG. 8) to the push notification server application 510, thus notifying the push notification server application 510 of the results of delivery failure at step S250.

The push notification client 300 checks a delivery condition 730 (FIG. 7) and a delivery condition value 740 (FIG. 7) from the push notification message 700 received from the push notification server 400 at step S1003.

If, as a result of checking at step S1003, the push notification message corresponds to a push notification message meeting a preferred delivery condition having high priority such as real-time/emergency/disaster notification/preferred delivery, the push notification message is sent, prior to other notification messages, to the push notification client application 200 that must receive the corresponding push notification message at step S311. In the case of preferred delivery by which a push notification message meeting a preferred delivery condition having high priority is sent in advance, the client may also employ a scheme and system for separately displaying a preferred delivery message through a separate user interface (UI). For example, in a push notification message display area of the client, a separate notification icon, image or message that enables a push notification message meeting a preferred delivery condition to be distinguished from a normal push notification message is displayed. Accordingly, the system of the present invention may be implemented so that the user can distinguish the preferred delivery message from the normal message, but the present invention is not limited to such an example.

If, as a result of checking at step S1003, the push notification message corresponds to a push notification message having low priority, the push notification client 300 sends the push notification message having low priority to the push notification client application 200 after the sending of push notification messages meeting the preferred delivery condition has been terminated at step S312.

If a push notification message is not sent in conformity with the above-described delivery condition, the push notification client 300 changes the push delivery state of the push notification message to a delivery failed state, and provides an error result message (see FIG. 9) to the push notification server application 510, thus notifying the push notification server application 510 of the results of delivery failure at step S350.

The push notification client application 200 checks a delivery condition 730 (FIG. 7) and a delivery condition value 740 (FIG. 7) from the push notification message 700 received from the push notification client 300, and transfers a push notification delivery result message depending on the delivery condition, for example, an error message (see FIG. 9) to the push notification server application 510 at step S400.

Below, a method for requesting the delivery state of a push notification message and receiving a response to a delivery state depending on the delivery step and the delivery state of the corresponding message will be described in detail with reference to FIG. 11.

Figure 11:
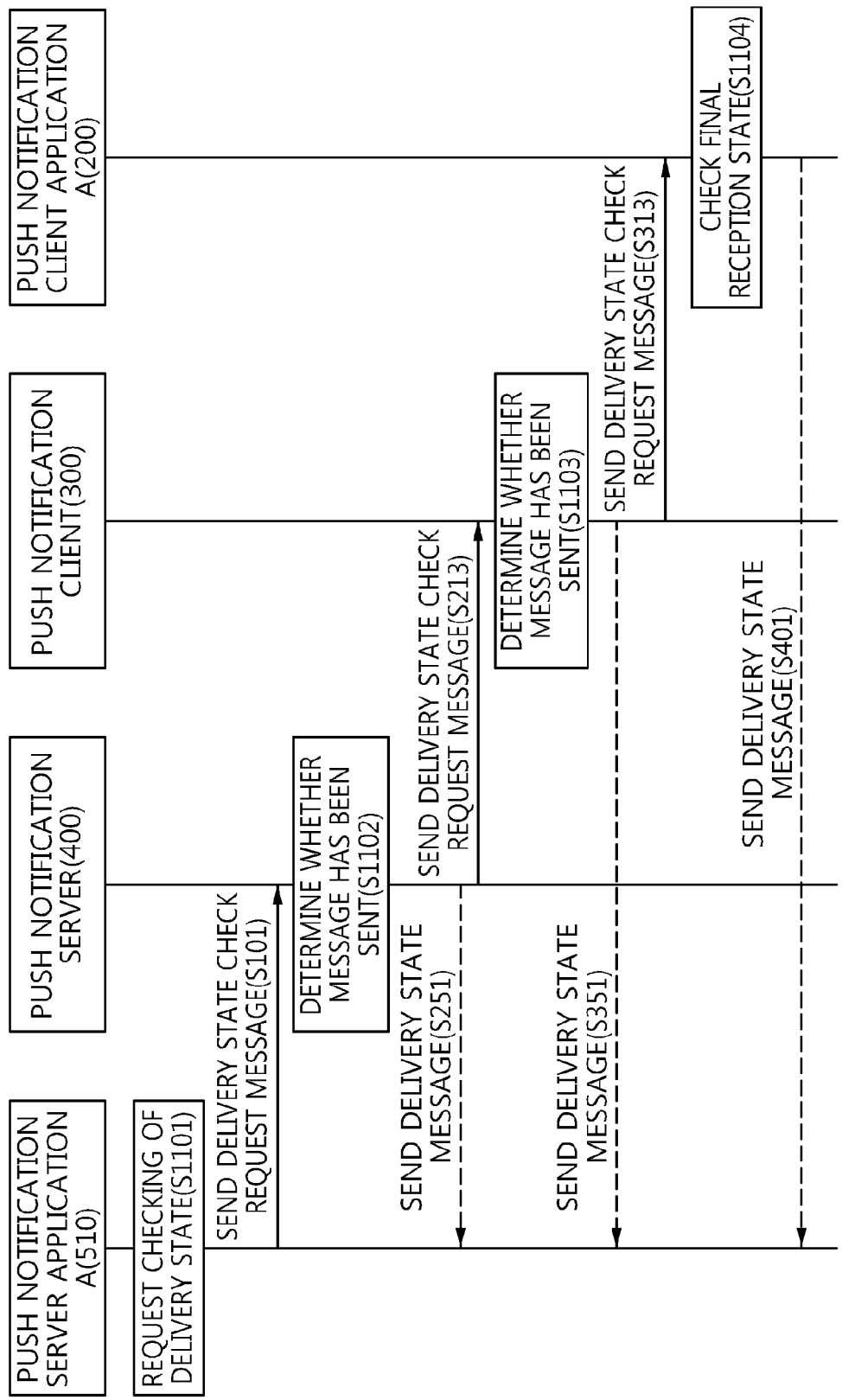
FIG. 11 is a flowchart showing a method for requesting the delivery state of a push notification message and receiving a response to a delivery state depending on the delivery step and the delivery state of the corresponding message according to an embodiment of the present invention.

FIG. 11 is a flowchart showing a method for requesting the delivery state of a push notification message and receiving a response to a delivery state depending on the delivery step and the delivery state of the corresponding message according to an embodiment of the present invention.

Referring to FIG. 11, the push provider 500 requests the push notification server application 510 registered in the push notification server 400 to check the delivery states of sent push notification messages.

That is, the push notification server application 510 receives the request to check delivery states from the push provider 500 at step S1101.

The push notification server application 510 sends a delivery state check request message to the push notification server 400 in response to the request received at step S1101 at step S101.

The push notification server 400 that received the delivery state check request message from the registered push notification server application 510 checks a message identification number 820 in the delivery state check request message 800 (FIG. 8), and determines whether the corresponding message has been sent at step S1102.

If it is determined at step S1102 that the corresponding message is waiting in the push notification server without being sent, the push notification server 400 notifies the push notification server application 510 of a delivery state message for the corresponding message at step S251. In contrast, if it is determined at step S1102 that the message has already been to the push notification client 300, the push notification server 400 sends a delivery state check request message 800 (FIG. 8) to the push notification client 300 at step S213.

The push notification client 300 checks the identification number of the message using the identification number 820 contained in the received delivery state check request message 800 (FIG. 8), and determines whether the corresponding message has been sent at step S1103.

If it is determined at step S1103 that the corresponding message has not yet been sent, the push notification client 300 sends a delivery state message corresponding to such a state to the push notification server application 510 at step S351. In contrast, if it is determined at step S1103 that the corresponding message has already been sent to the push notification client application 200, the push notification client 300 sends a delivery state check request message 800 (FIG. 8) to the push notification client application 200 at step S313.

The push notification client application 200 checks the final reception state of the message corresponding to the delivery state check request message 800 (FIG. 8) received from the push notification client 300 at step S1104, and transfers a delivery state message corresponding to such a state to the push notification server application 510 at step S401.

In this way, the present invention may manage delivery states for respective stages of a procedure in which a push notification message is delivered from a push notification server application to a push notification client application within a user terminal through the push notification server, and may deliver push notifications depending on delivery conditions.

Accordingly, the present invention is advantageous in that it can manage delivery states for respective stages of a procedure in which a push notification message is delivered from a push notification server application to a push notification client application within a user terminal through the push notification server, and can process various types of processing depending on delivery conditions, thus efficiently processing the conditions, such as delivery checking, emergency delivery, delivery cancellation, delayed delivery, preferred delivery, and a content update, which occur in a push notification message delivery process.

A conventional push server is configured such that, if it does not receive a response message from a client within a predetermined period of time after sending a push message, it is considered that the delivery of the push message has failed. Further, when a response is not received from the client, the push server merely recognizes that delivery has failed, and does not perform additional handling.

However, the present invention can perform various types of processing corresponding to various states, such as the checking of a delivery state, resending performed in the case of delivery failure, and delivery cancellation, thus providing a push message delivery system that is more reliable and guarantees stability.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for delivering a push notification, comprising:
   receiving, by a push notification server, a push notification message from a push notification server application;
   sending, by the push notification server, the push notification message to a push notification client registered in association with the push notification server application;
   if the push notification message has not yet been sent, storing the push notification message in a transmission queue within the push notification server, and resending the push notification message stored in the transmission queue to the push notification client, or processing an update, expiration or cancellation for the push notification message; and
   changing a push delivery state of a push notification message, sending of which has failed, to a delivery failed state, and transferring an error message corresponding to results of the failed sending to the push notification server application,
   wherein the error message includes an error message code indicating a type of error, and
   wherein the error message further includes a control command field and an identification number field indicating a message in which an error has occurred.

2. The method of claim 1, wherein receiving the push notification message comprises checking a delivery condition from the push notification message, and determining, based on results of checking the delivery condition, whether the push notification message corresponds to a high-priority push notification message or a low-priority push notification message.

3. The method of claim 1, wherein sending the push notification message comprises setting priority of the push notification message depending on a delivery condition contained in the push notification message, and sending the push notification message depending on the set priority.

4. A method for delivering a push notification, comprising:
receiving, by a push notification server, a delivery state check request message for each push notification message from a push notification server application;
determining whether a corresponding push notification message has been sent, using an identification number contained in the delivery state check request message;
if the corresponding push notification message, a delivery state of which is requested to be checked, has not yet been sent, transferring a delivery state message for the corresponding push notification message to the push notification server application; and
if the corresponding push notification message, the delivery state of which is requested to be checked, has already been sent, sending a delivery state check request message to a push notification client,
wherein the delivery state check request message includes a delivery state message code indicating a message code for a delivery state request, and
wherein the delivery state check request message further includes a control command field and an identification number field indicating a message, a state of which is requested to be checked.

5. A push notification server, comprising:
a processor; and
a memory storing computer instructions, when executed, causing the processor to:
register and manage each push notification server application that sends a push notification message via a server application management unit;
receive the push notification message from the push notification server application via a message reception unit;
send the push notification message to a push notification client in a specific terminal in correspondence with a push delivery condition, and manage a push delivery state via a message delivery management unit;
manage a list of terminals that receive the push notification message via a client management unit; and
inspect authority to send the push notification message between the push notification server application and the push notification client and take charge of authentication of the push notification server application and the push notification client via an authority management unit,
wherein the message delivery management unit changes a push delivery state of a push notification message, sending of which has failed, to a delivery failed state, and transfers an error message corresponding to results of the failed sending to the push notification server application,
wherein the error message includes an error message code indicating a type of error, and
wherein the error message further includes a control command field and an identification number field indicating a message in which an error has occurred.

6. The push notification server of claim 5, wherein the message delivery management unit sets delivery priority depending on a delivery condition contained in the push notification message, and sends the push notification message depending on the set priority.

7. The push notification server of claim 6, wherein when the delivery condition contained in the push notification message is a preferred delivery condition, the push notification message is sent prior to other messages.

8. The push notification server of claim 5, wherein the message delivery management unit is configured to, if the push notification message has not yet been sent, store the push notification message in a transmission queue within the push notification server, and resend the push notification message stored in the transmission queue to the push notification client, or process an update, expiration or cancellation for the push notification message.

* * * * *